June 13, 1933.  S. T. MORELAND  1,913,769
ROLLER BEARING
Filed May 31, 1930   3 Sheets-Sheet 1
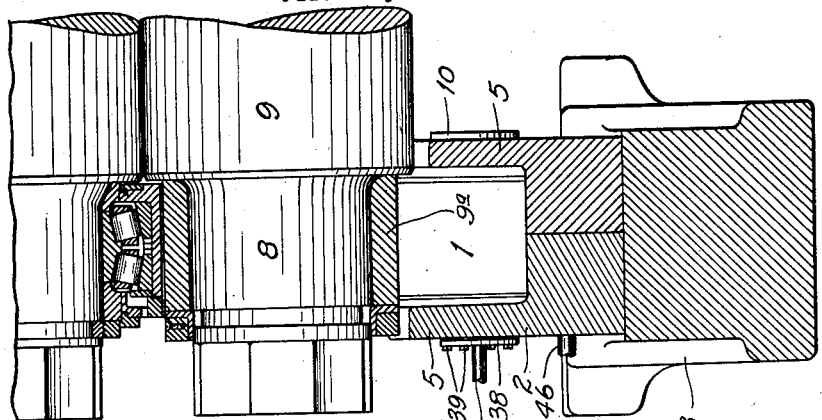
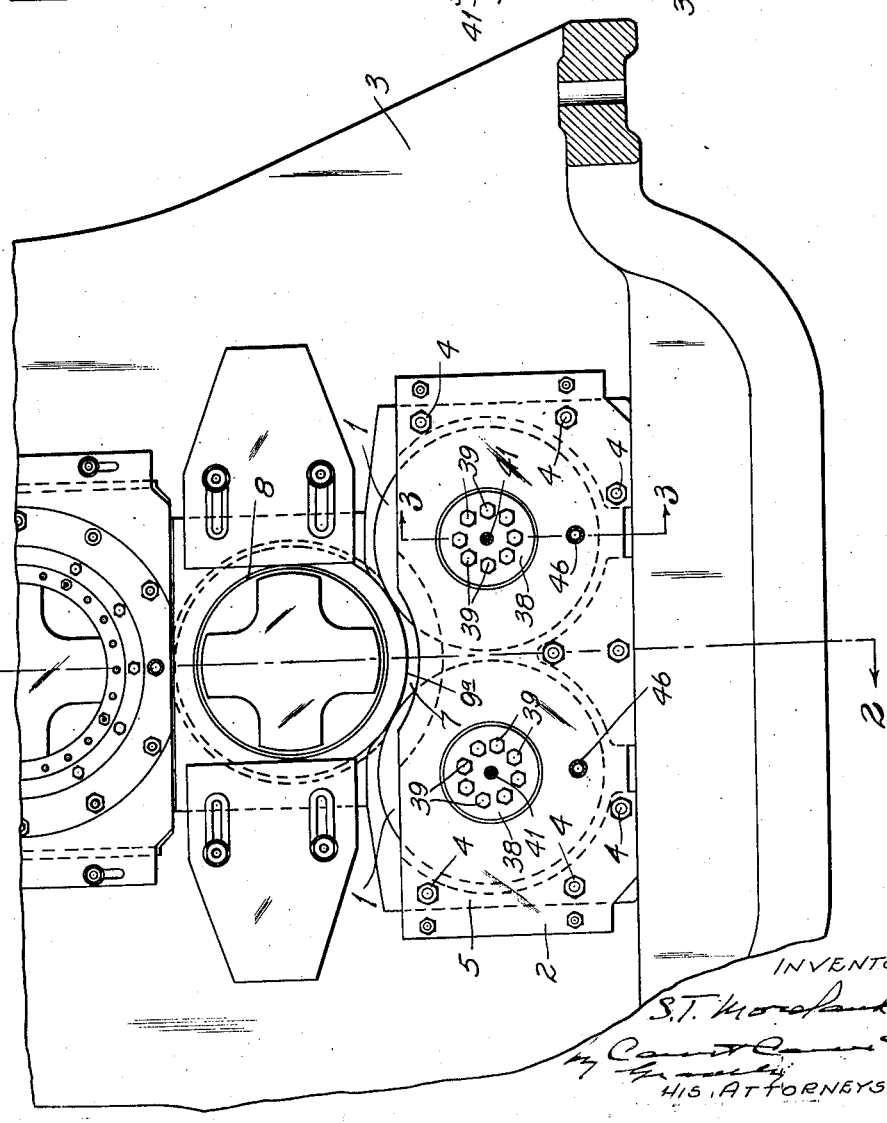

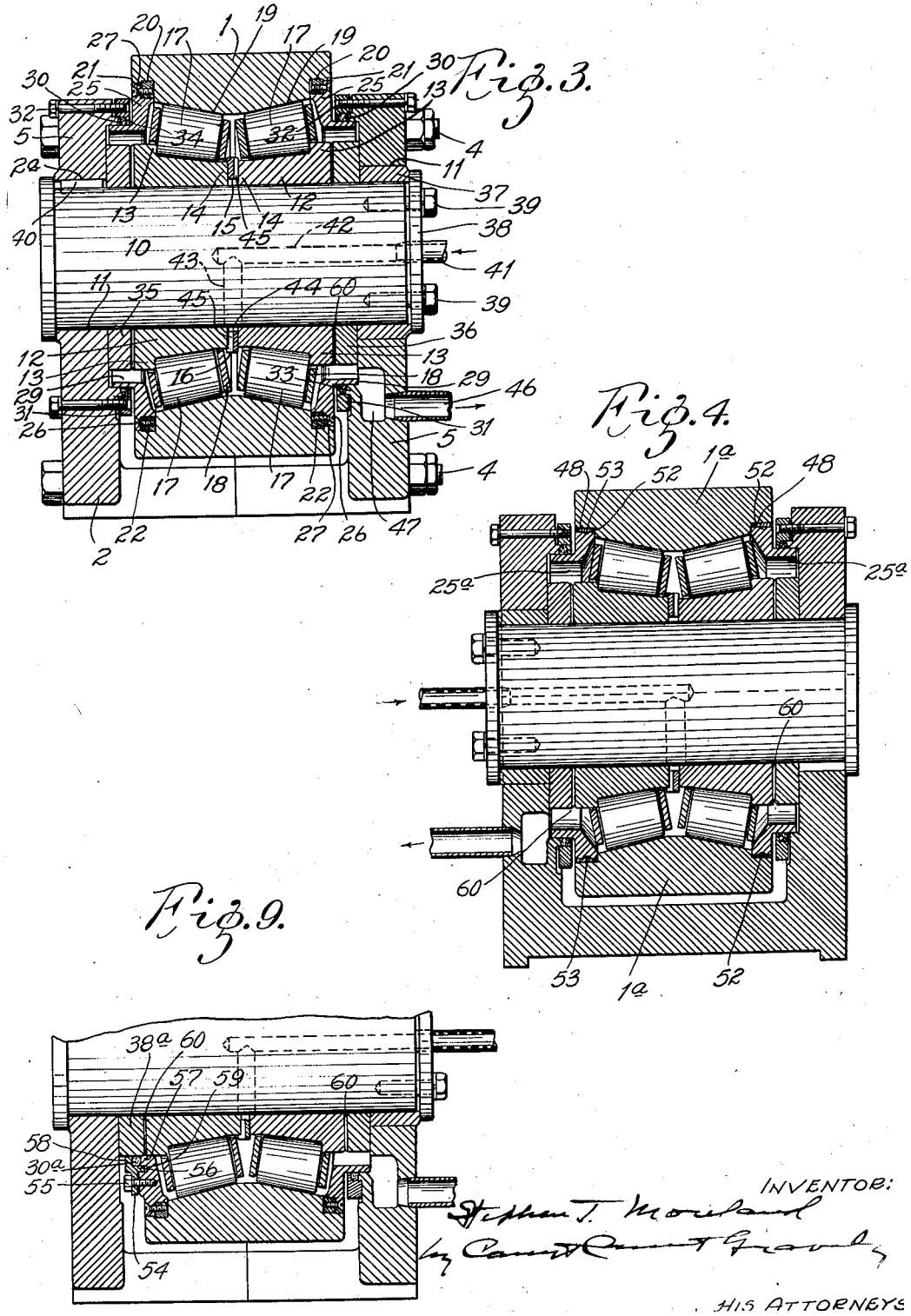

June 13, 1933.    S. T. MORELAND    1,913,769
ROLLER BEARING
Filed May 31, 1930    3 Sheets-Sheet 3
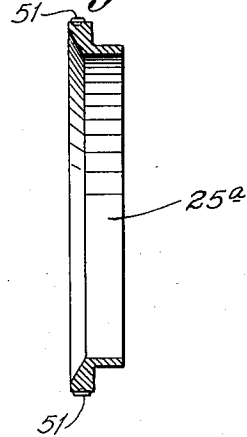
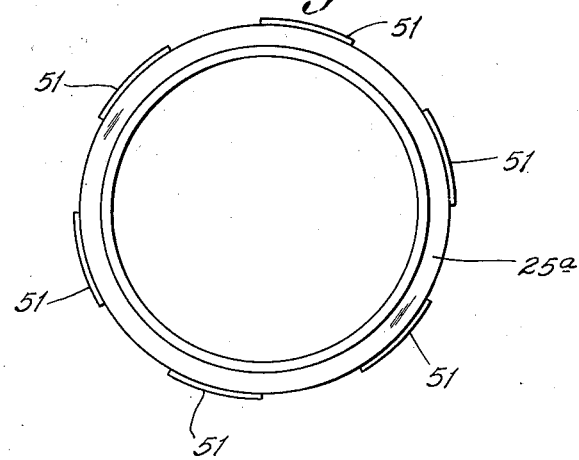
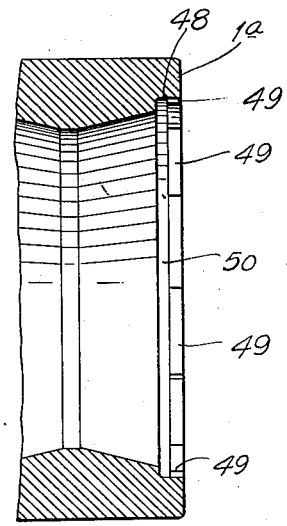
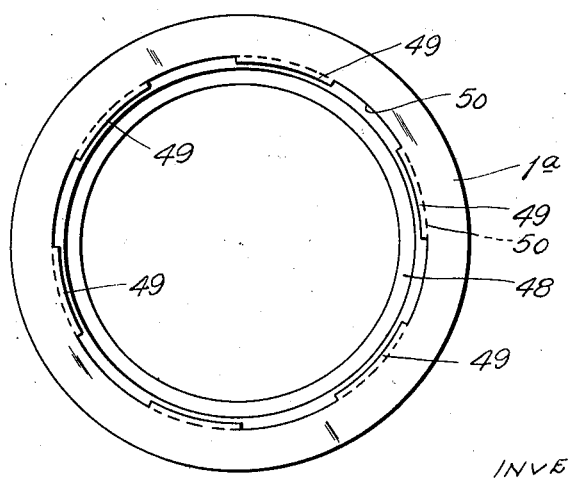
INVENTOR:
Stephen T. Moreland
by Carroll Carruthers
HIS ATTORNEY.

Patented June 13, 1933

1,913,769

UNITED STATES PATENT OFFICE

STEPHEN T. MORELAND, OF CANTON, OHIO, ASSIGNOR TO THE TIMKEN ROLLER BEARING COMPANY, OF CANTON, OHIO, A CORPORATION OF OHIO

ROLLER BEARING

Application filed May 31, 1930. Serial No. 458,140.

My invention relates to a roller bearing construction wherein said bearings are subjected to severe stresses and a large amount of heat, and a thorough lubrication of the parts must be obtained in order to insure proper action of the bearings. This is particularly true in bearings for backup rolls on rolling mills, and my invention is particularly adapted for such use. In bearings of this type, considerable difficulty has been encountered in economically lubricating said bearings and obtaining and maintaining a suitable lubricant reservoir in the bottom portions thereof. The principal object of this invention is to provide for continuous lubrication of such a bearing, to obtain a high lubricant level in the bottom portion thereof and prevent leakage therefrom.

My invention consists principally in means for continuously feeding the lubricant to a roller bearing, and a novel method of securing annular oil confining rings to the outer ends of the outside bearing member whereby said rings will entrap the lubricant between them and define a relatively high lubricant level in the bottom portion of the bearing. It also consists in the parts, combinations and arrangements of parts hereinafter described and claimed.

In the accompanying drawings wherein like numerals refer to like parts wherever they occur, Fig. 1 is an end view of the bottom portion of a two high hot sheet mill, Fig. 2 is a view along the line 2—2 of Fig. 1, Fig. 3 is a vertical section along the line 3—3 of Fig. 1 showing a backup roll bearing construction embodying my invention, Fig. 4 is a sectional view of a modification of my invention, Fig. 5 is a detail sectional view of the oil confining ring shown in Fig. 4, Fig. 6 is an end view of Fig. 5, Fig. 7 is a detail sectional view of an end of outer bearing member shown in Fig. 4, Fig. 8 is an end view of Fig. 7; and Fig. 9 is a sectional view of another modification.

While my invention is applicable to other types of bearings, for the purpose of describing my invention, I have shown a backup roll bearing arrangement for a two high hot sheet mill and in the construction illustrated, two back up rolls 1 are mounted in a bearing housing 2 which is mounted in a rolling mill side frame 3, said housing being split vertically in the center, and the inner and outer portions of the bearing housing being held together by suitable bolts 4.

The sides 5 of the bearing housing extend almost to the top of the back up rolls and extending in an opening 7 in the side frame between the top portions of the back up rolls and resting thereon is a neck portion 8 of a working roll 9 provided with a wear ring 9a, said back up rolls constituting a lower bearing therefor. While the bearing housing is preferably split in order to facilitate assembling the bearing, it is obvious that an integral housing may be used without departing from my invention.

Each back up roll 1 is mounted on a pin 10 extending through openings 11 in the bearing housing 2 and roller bearings (hereinafter described) are interposed between said pin and the roll member 1 which constitutes an outer bearing member for the bearings. Mounted on the pin 10 are two cones 12 having a thrust rib 13 on each outer end, and whose smaller ends 14, are separated by a cone spacer 15 preferably located around the center of the journal. Said spacer has an annular rib 16 on one side flush with its outer periphery, said rib engaging one of the cones 12 to hold said cone spacer in position. A series of conical rollers 17, mounted in suitable cages 18, engage each cone and cooperating with each cone are two conical raceways 19 provided on the outer bearing member 1 whose outer periphery supports the working roll neck portion 8. Provided near each outer end of said outer member is an annular recess 20 which is bordered by a short annular rib 21 on the end of said member. Into each recess 20 is inserted an annular ring 22, preferably split, of soft iron or steel and held therein by the inner edge of said annular rib 21. The ring 22 is provided with threaded openings therethrough, and an annular oil confining ring 25 is secured to each ring by screws or bolts 26 extending through an annular flange 27 provided on the outside periphery of said oil confining ring 25, said flange engaging the cylindrical surface defined by the rib 21. The inner end of the oil confining ring 25 adjacent its outside periphery engages the inner edge or wall of the annular recess 20; and when the screws 26 are fully tightened, the outer end of the mounting ring 22 is pulled against the inner edge of the annular rib and the inner end of the oil confining ring is pressed against the inner wall of the annular recess thereby holding the oil ring 25 securely on the outer bearing member.

The oil confining rings 25 are adapted to extend upwardly in the bottom portion of the bearing to the height at which the lubricant level is desired in the bearing, and each ring is provided on the inside periphery with an annular flange 29 extending almost to the inside walls of the bearing housing 2, said flange constituting a deflecting means for lubricant as it rises above the lubricant level of the bearing. Engaging the outer periphery of each annular deflecting flange 29 is a sealing ring 30 of felt or the like, suitably secured by a clamping ring 31 which is secured to the housing 2 by means of screws 32. The inner edge of said sealing ring engages an annular rib 33 provided on the inside wall of the housing, whereas the other edge of said ring engages an annular flange 34 provided on said clamping ring 31.

Located at the forward end of the bearing, and engaging the outer end of the cone is a spacer ring 35 which abuts against the inside wall of the bearing housing, and a similar spacer ring 36 engages the end of the cone at the rear end of the bearing and the outer end of said ring engages a third spacer ring 37 which extends a slight distance past the end of the outer end of the pin. A suitable end plate 38 engages the outer end of said ring 37 and said plate 38 is suitably secured to the pin 10 by bolts 39 extending through said plate and into the pin, having threaded engagement therewith, for holding the bearings in position. Preferably in order to prevent the pin 10 from rotating in the housing a key 40 is inserted in a groove in the pin and engages a groove 2a in the wall of the opening 11 in the housing.

In order to lubricate the bearings, an oil inlet pipe 41 extending through the center of the end plate communicates with a central bore 42 in the pin, and communicating therewith is a radial opening 43 near the center of the journal which extends to the space 44 between the cone spacer 15 and the pin 10. The cone spacer is provided at regular intervals with radial grooves 45, and it is obvious that when oil is delivered to the inlet it will flow by gravity through the radial grooves in the cone spacer and finally lodge in the bottom portion of the bearings. The oil confining rings, however, being provided at the ends of the outer bearing member will define and entrap the oil therebetween in the bottom portion of the bearing, said oil having as its only outlet, the path to each side of the bearing housing along the annular deflector flanges provided on said rings. In order to provide a lubricant escape therefor, an oil outlet pipe 46 communicates with a small reservoir 47 provided in the outer wall of the bearing housing, whereby the oil after passing over the deflector flange will flow into said reservoir and thence out through the oil outlet pipe and may be used over again.

In the modification shown in Fig. 4, the construction of the bearings is similar to that shown in Fig. 3, the difference being in the manner in which the oil confining rings are secured to the ends of the outer bearing member 1a. In this construction, instead of using an annular ring inserted into an annular recess and securing the oil confining ring to said ring, a bayonet lock construction is used. An annular recess 48 on each end of said outer bearing member 1a is provided at intervals with circumferential extensions 49 on the end, the space 50 between them and the edge of the recess being adapted to receive protruding circumferential extensions 51 provided on the outside edge of the oil confining rings 25a. Said oil confining rings are inserted in the recess so that the protruding extensions 51 pass between the extensions 49 on the outer bearing member 1a, and the rings are then rotated until the extensions thereon wedge between the extensions in the recess and the inner edge of said recess which locks the rings on the outer bearing member. Preferably in order to prevent unlocking, Babbitt metal 52 or the like is poured into the recesses 53 left vacant upon locking the rings.

In the modification illustrated in Fig. 9 instead of seating the closure rings 30a at both ends of the bearing upon the outer periphery of the annular flange, the closure ring at the forward side of the bearing is seated on the spacer ring 38a between the cone and the housing. A clamp ring 54 secured to the oil confining ring by screws 55 is provided with an annular flange 56 for engaging the outside edge of said closure ring 30a, whereas the inner edge engages an annular rib 57 on the oil confining ring and the outside periphery of said closure ring engages a second annular flange 58 provided on said clamping ring 54 which extends into an annular recess 59 in the oil confining ring adapted to receive the same.

Preferably in each of the above described bearings, grooves 60 are provided between the spacer rings and cone ends in order to hold lubricant and prevent galling or abrading of the rings and cone surfaces.

What I claim is:

1. In a roller bearing an outer bearing member having an annular recess near the end and a low annular rib bordering said recess on the end of said outer bearing member, a split ring sprung into this recess and held therein by the inner edge of said rib, and an oil confining ring secured to said ring.

2. A roller bearing comprising a housing, a pin therein, an outer bearing member mounted around said pin, rollers interposed between said pin and said outer bearing member, an annular recess provided near the end of said outer bearing member, a ring sprung into said recess provided with openings therethrough, a short annular rib provided on said outer bearing member and bordering said recess whose inner edge abuts against said ring, an oil confining ring provided with an annular flange having openings therethrough fitting in the cylindrical bore defined by the ribs, and screws extending through said openings and having threaded engagement with the openings in the ring.

3. A roller bearing comprising a housing, a pin mounted therein, an outer bearing member mounted around said pin, rollers interposed between said pin and said outer bearing member, an oil confining ring secured to the end of said outer bearing member, means for feeding oil to the middle of the bearings and an oil outlet opening through the housing communicating with the space between the pin and outer bearing member.

4. A roller bearing comprising a housing, a pin mounted therein provided with an oil inlet, a radial opening in said pin communicating with said oil inlet, an outer bearing member mounted around said pin, oil confining rings secured to the ends of said outer bearing member, annular flanges provided on said oil confining rings extending almost to the inner housing walls, an oil outlet opening through the housing adjacent to the lowermost end portion of one of said flanges and sealing rings mounted between the outer periphery of said flanges and said housing.

5. A roller bearing comprising a housing, a pin mounted therein provided with an oil inlet, a radial opening in said pin communicating with said inlet, an outer bearing member mounted around said pin, oil confining rings having annular deflector flanges secured to the end of said outer bearing member on each side of said radial opening, a hollow portion adjacent to the lower portion of said bearing in the wall of said housing, said hollow portion having an opening into said bearing extending partly below and partly above an annular deflector flange, and an oil outlet communicating with said hollow portion below said flange.

6. A roller bearing comprising a housing, a pin mounted therein, cones mounted on said pin, an outer bearing member mounted around said pin, rollers interposed between said cones and said outer bearing member, means provided in said pin for feeding oil between said cones, oil confining rings provided on each end of said outer bearing member, an oil outlet through said housing communicating with the lower portion of the bearings between said cone and said outer bearing member and sealing means interposed between the oil confining rings and the inside housing wall.

7. A roller bearing comprising a housing, a pin mounted therein, cones mounted on said pin and separated by a spacer ring provided with radial openings, an outer bearing member mounted around said pin, rollers interposed between said cones and said outer bearing member, means provided in said pin for feeding oil between said cones, oil confining rings provided on each end of said outer bearing member, an oil outlet communicating with the lower portion of the bearings and sealing means interposed between the oil confining rings and the inside housing wall.

8. A roller bearing comprising a housing, a pin extending therein, cones mounted thereon, an outer bearing member mounted around said pin, rollers interposed between said cones and said outer bearing member, an oil confining ring secured to one end of said outer bearing member, an oil opening through the housing at the bottom portion of said bearing communicating with the space between the cones and outer bearing member, means interposed between said oil confining ring and said housing for sealing the bearing, a second oil confining ring secured to the other end of said outer bearing member and means interposed between said confining ring and a spacer ring mounted on the pin for sealing the bearing at that end.

9. In a roller bearing an outer bearing member with an annular recess provided with protruding circumferential extensions at the end thereof, and an oil confining ring provided with protruding circumferential extensions inserted between the inner edge of said annular recess and the protruding circumferential extensions provided at the end of said recess.

10. In a roller bearing, an outer bearing member having an annular recess near the end thereof, a mounting ring in said recess, an oil ring having its inner end engaging the inner wall of said recess, and means extending through said oil ring and into said mounting ring for securing said oil ring thereto.

11. In a roller bearing, an outer bearing member having an annular recess near the end thereof, a split mounting ring sprung into said recess, an oil confining ring having its inner end engaging the inner wall of said recess, and means extending through said oil confining ring and into said mounting ring for securing said oil confining ring thereto.

Signed at Canton, Ohio, this 24 day of May 1930.

STEPHEN T. MORELAND.